United States Patent [19]

Siedenstrang

[11] 3,841,899

[45] Oct. 15, 1974

[54] TREATING MILL AND CALENDER ROLLS IN RUBBER COMPOUNDING

[75] Inventor: Roy W. Siedenstrang, Stow, Ohio

[73] Assignee: Phillips Petroleum Company, Bartlesville, Okla.

[22] Filed: Oct. 30, 1972

[21] Appl. No.: 301,900

[52] U.S. Cl.................. 117/94, 117/49, 425/90
[51] Int. Cl............................................ B05b 13/06
[58] Field of Search............ 117/6, 47 R, 94, 111 R, 117/49; 425/90, 107; 249/114, 115; 264/177 R

[56] References Cited

UNITED STATES PATENTS

| 2,201,271 | 5/1940 | Partridge | 249/115 |
| 2,937,406 | 5/1960 | Toddy | 249/115 |
| 3,517,097 | 6/1970 | Mixell et al. | 425/90 |
| 3,600,309 | 8/1971 | Loser et al. | 264/177 R |

*Primary Examiner*—J. Travis Brown

[57] ABSTRACT

The sticking of rubbery stocks to mill and calender rolls can be alleviated by treating the rolls with alkanolamines, alkylene glycols, or polyalkylene glycols.

12 Claims, No Drawings

TREATING MILL AND CALENDER ROLLS IN RUBBER COMPOUNDING

FIELD OF THE INVENTION

The invention relates to the treatment of roll surfaces to alleviate sticking of rubber stocks.

BACKGROUND OF THE INVENTION

A variety of additives are incorporated into natural and synthetic rubbers and elastomeric polymers for a variety of purposes. Such additives include fillers, colorants, stabilizers, antioxidants, reinforcing agents, and the like. Powdered additives frequently are incorporated into elastomers by means of mixing on a roll mill such as a two-roll mill with idler roll. The forces exerted on the rubber passing between the rolls are compressive, i.e., normal to the surface of the roll, which produces a lateral shearing and mixing action in the circumferential direction. In calendering a thermoplastic material, the material usually is mixed in such as a Banbury mixer, and then extruded into the calender which by means of a series of rolls squeezes the material to reduce thickness and produce a product in relatively thin sheets. A variety of calenders and roll mixers are known in the arts.

A major problem with devices incorporating large rollers to handle hot thermoplastic materials has been a tendency for many of the thermoplastic materials to exhibit stickiness and adherence to the rolls. To say the least, this tends to "gum up the works."

Efforts to solve the problem have included the addition of a hydrocarbon acid ester of a phosphoric acid to a rubbery diene polymer, such as described by Paul W. Solomon in U.S. Pat. No. 3,050,487, patented Aug. 21, 1962. While such additives are effective, yet frequently due to the delicate nature of the balance of additives employed in rubbers, a further additive may be undesirable or may conflict with additives employed for particular purposes.

OBJECTS OF THE INVENTION

It is an object of the invention to reduce stickiness of rubbers on rollers. A further object of the invention is to provide a method of treatment of rollers to reduce stickiness of rubbers thereon.

Other aspects, objects, and the several advantages of my invention will be apparent to one skilled in the art from the following disclosure and my appended claims.

BRIEF SUMMARY OF THE INVENTION

The sticking of rubber stocks to mill and calender rolls can be alleviated by treating the rolls of an alkanolamine or mono or polyglycol as release agent.

DETAILED DESCRIPTION OF THE INVENTION

Treatment of the roller surfaces in a rolling device for handling of rubbery stocks with a treating or release agent selected from alkanolamines, alkylene glycols, polyalkylene glycols, or mixtures of two or more of either or of any, produces a surface effect that substantially avoids and alleviates stickiness of the elastomeric stock to the roller surface.

TREATING AGENTS

The treating agents employed in the process and method of my invention are alkanolamines, alkylene and polyalkylene glycols. Particularly useful materials are those that are normally liquid, though solids can be utilized where a suitable dispersion can be made, such as in water. Of these, I presently prefer the alkanolamines, more preferably the trialkanolamines, and presently most preferred is triethanolamine.

According to the process of my invention, one or more treating agents from one or more of the described groups are applied either directly or as a dilute solution to the metal surface of the roll. Since only small amounts of the active materials are necessary for treatment of the surfaces, for purposes of spreading relatively small amounts of treating agent, solutions are a convenience. The treating agents can be diluted with water, with lower alcohols, or with ketones, in all proportions. Water presently is preferred for availability and ease of handling. Mixtures of diluents can be employed where desired in any proportion or where of assistance with higher molecular weight species of treating agents. The lower alcohols employed include those which are normally liquid and are suitable as diluents or dispersants for the release agents, preferably of one to four carbon atoms, such as methyl, ethyl, any of the propyl or butyl alcohols, and the like. The lower ketones include those of similar nature, preferably up to eight carbon atoms per molecule, such as methyl, ethyl, propyl, butyl, and combination, such as ethyl hexyl ketones, and the like.

The amount of treating agent employed should be that minor amount effective to provide release effect to the roll surface. The material, or solution or dilution thereof, can be applied in any suitable manner by spraying, wiping, brushing, dripping, or other, as may be suitable. A presently expedient and convenient dilution is of the order of about 10 to 80, preferably 20 to 60, weight percent of agent in an aqueous medium.

The amount of material to be applied to the metal surface does not appear to be critical or limited, but simply a minor amount suitable to provide the effect desired, without wasting material. Excessive amounts can be readily removed by drying or wiping. Simple treatment of the metal surface with the treating agent is satisfactory, and it is not necessary to be particularly careful about the amount employed.

The frequency of treatment can be governed by observing the rollers and rubber at the point where the rubber is taken from the roller, and if any tendency for sticky occurs, then the surface can be retreated. My treating agents are compatible with all known natural and synthetic rubbers and curing systems, and with other known compounding ingredients. Therefore, the treatment of the roller can be accomplished, if desired, while the rubber compounding operation is going on, by simply using a wiper, roll, brush, dripper, sprayer, or other means effective for applying a light application of the treating agent to the roller surface. Means can be incorporated into the roller machinery for periodically applying a quite small amount of treating agent dilution onto the roller surface infrequently or as necessary according to the observations of the operator.

Since mills are manufactured in a wide variety of sizes with rolls from six inches to one-hundred inches long, and two inches to thirty-six inches in diameter, with larger sizes even in the mill so to speak, mechanical means of applying my treatment agent can readily be envisaged for convenience during compounding operations.

Calendering and mixing operations for plastic materials are described in such as *Encyclopedia of Polymer Science and Technology*, Vol. 2, pp 802–813 (Copyright 1965), and *The Applied Science of Rubber*, Edited by W. J. S. Naunton, Edward Arnold (Publishers) Ltd., pp 289–318 (1961)

Typical commercial mills have two rolls which turn toward each other at a fixed rate in operation, one roll usually turning somewhat faster than the other in order to produce a desired shearing action. The elastomeric compound is placed on top of the mill, passed between the two rolls, formed into a sheet or banded onto one of the rolls. A calender is similar, but may have multiple rolls, each turning at the same rate usually. Where the elastomeric compound formulation tends to be sticky, or components therein tend to be sticky, difficult operations can occur. Particular difficult are carbon black filled rubber compounds containing relatively high loadings of tackifying resins such as the terpene phenolic resins, coumerone-indene resins, wood rosin oils, and the like, since these as well as other compounding ingredients such as clays, tend to make a sticky rubber stock.

Application of my treating agents alleviates the sticky problem.

Among the alkanolamines which can be employed in the process of my invention and as treating agents according to my invention, are those which can be represented by the general formula

in which each R contains up to six carbon atoms per R group, and R itself represents

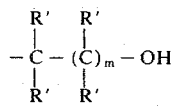

such that $n$ is an integer and can be 1, 2, or 3; $m$ also is an integer of 1 through 5; each R' is individually selected from hydrogen or alkyl such as methyl, ethyl, n-propyl, isopropyl, tertiary butyl, and the like, and two R' groups and the carbons can represent a cyclic structure such as cyclopentyl, cyclohexyl, or the like.

Representative examples of suitable alkanolamines include monoethanolamine, diethanolamine, the presently preferred triethanolamine, as well as methylethanolamine, butylethanolamine, diisopropylethanolamine, aminoethylethanolamine, any of the isopropanolamines, such as mon, di, triisopropanolamine, dibutylisopropanolamine, N-(2-hydroxypropyl)diethylamine, tributanolamine, di-(b 2,3-dimethylbutanol)amine, di-(2-ethylpropanol)amine, N-tri-(2-methylpentanol)amine, N-di(2,3,-dimethylbutanol)cyclohexylamine, and the like.

The alkylene glycols which can be employed according to the process and method of my invention of treating the roll surfaces of rubber compounding mills and calendering mills preferably are those containing up to six carbon atoms per molecule.

Exemplary alkylene glycols include ethylene glycol, propylene glycol, 1,2-butane diol, 1,3-butane diol, 1,4-butane diol or tetramethylene glycol, 2,3-butane diol, 1,4-hexane diol, pentamethylene glycol, hexymethylene glycol, and the like.

Of the polyalkylene glycols useful in accordance with a method and process of my invention of treating the roll surfaces of compounding mills include the polyethylene glycols and polypropylene glycols are preferred and may be represented by the formulae

and

in either of which $n$ is an integer of at least 2, usually commercially 2 to 25.

Representative examples of the polyethylene and polypropylene glycols include di(ethylene)glycol, tri(ethyleneoxy)glycol, dodecyl(ethyleneoxy)glycol, eicosyl(ethyleneoxy)glycol, dipropylene glycol, tri(-propyleneoxy)glycol, dodecyl(propyleneoxy)glycol, eicosyl(propyleneoxy)-glycol, and the like.

Such products are available as commercial mixtures under a variety of trade names, usually containing mixtures of a number polyethylene glycols, or of polypropylene glycols, in which n represents an average and not necessarily a whole number.

The materials useful in the context of my invention include mixed polyethylene-polypropylene glycols which can be represented by

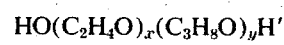

wherein H' can be either hydrogen or alkyl, and in which the oxide units of the mixed products are of relatively random distribution. Such materials are commercially important and are sold under a variety of trade names. Water solubility of the products is governed by the ratio of ethylene oxide to propylene oxide used to prepare the final product, since the ethylene oxide units are hydrophilic and the propylene oxide units are hydrophobic. Products which contain at least 40 weight percent ethylene oxide are water soluble at room temperature and are preferred in the process and method of my invention.

Elastomers compounded on machinery to which my invention is applicable include any of the natural or synthetic rubber materials including the polyconjugated dienes such as polybutadiene, copolymers of conjugated dienes with monovinyl-substituted aromatic compounds such as the butadiene/styrene copolymers, various other classes of rubbery or elastomeric materials including the nitrile rubbers, urethanes, polyisoprenes, neoprenes and any other elastomeric material common in compounds with fillers and tackifiers which tend to contribute to sticking problems on processing rolls.

EXAMPLE

Exemplary conditions and species employed are intended to be further illustrative of my invention, and not limitative of the reasonable and proper scope thereof.

EXAMPLE I

In a two roll steel surface rubber mill in which the roll ratio (front to back) employed was about 1:1.3, the mill was operated at a front roll temperature of about 100° F., a back roll temperature of about 110° F., operative clearance about 0.500 inch, with a surface speed of the front roll of 30 feet per minute, and back roll 40 feet per minute. The rubber being compounded was a solution polymerized random 75/25 copolymer of butadiene/styrene (Solprene 1206, Phillips Petroleum Co.) rubber, being compounded with a nonstaining, solution polymerized random 75/25 copolymer of butadiene/styrene extended with 37.5 parts of naphthenic oil (Solprene 375, Phillips Petroleum Co.) in a rug underlay sponge formulation. This material exhibited relatively severe stickiness particularly when high loadings of the extender oil and fillers were obtained.

The roll surfaces were treated with a light application of a 25 percent by weight aqueous solution of triethanolamine applied directly to the roll surfaces. The treatment resulted in loosening of the sticky stock and preventing further sticking for several hours. Retreatment was made as necessary.

In a three roll inverted L calender, nine foot, polysteel surfaces, top roll 100° F., middle 110° F., bottom 100° F., operative aperture about 0.052 inch, surface feed about 36 feet per minute, the same stickiness was observed in the above-described stock. Treatment of the roll surfaces as described above alleviated further sticking for several hours. My exemplary description illustrates the use and application of my invention.

Certainly, reasonable variations and modifications of my invention are possible yet still within the scope of my disclosure and without departing from the intended scope and spirit thereof.

I claim:

1. In a process of rubber compounding wherein at least one elastomeric stock is contacted by roll surfaces, the improvement which comprises treating said roll surfaces with at least one roll release agent which is an alkanolamine, alkylene glycol, or mixture, in an amount sufficient to act as a release agent toward said elastomeric stock.

2. The process according to claim 1 wherein said release agent is applied as dilution thereof wherein the diluting agent is water, lower alcohol, lower ketone, or mixture, and said dilution contains about 20 to 60 weight percent of said release agent based on weight of dilution.

3. The process according to claim 1 wherein said roll release agent is said alkanolamine and said alkanolamine is represented by

wherein each R contains up to six carbon atoms per R group and is represented by

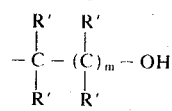

wherein $n$ is an integer and is 1, 2, or 3; $m$ is an integer of 1 through 5 inclusive; each $R'$ is hydrogen or alkyl and two $R'$ groups and the carbon atoms in the above formula can represent a cyclic structure.

4. The process according to claim 1 wherein said alkylene glycol contains up to six carbon atoms per molecule.

5. The process according to claim 3 wherein said elastomeric stock is natural or synthetic rubber, and when synthetic is polyconjugated diene, copolymer of conjugated diene with monovinyl-substituted aromatic compound, nitrile rubber, urethane rubber, neoprene, or mixture.

6. The process according to claim 5 wherein said elastomeric stock is a rubbery butadiene/styrene copolymer.

7. The process according to claim 6 wherein said alkanolamine is triethanolamine.

8. The process according to claim 7 wherein said alkanolamine is applied as about 25 percent by weight of said triethanolamine in aqueous solution to said roll surface.

9. The process according to claim 5 wherein said treating agent is applied by wiper means, roller means, brush means, spray means, or dripper means, combination.

10. In a process of compounding an elastomeric stock wherein said elastomeric stock is subjected to milling or calendering by contacting with roller surfaces, the improvement which comprises treating one or more said roller surfaces with at least one roll release agent which is an alkanolamine, alkylene glycol, or dilution thereof, in an amount sufficient to act as a release agent toward said elastomeric stock in said compounding process, and where said dilution is employed, the diluting agent thereof is water, lower alcohol, or lower ketone.

11. The process according to claim 10 wherein said release agent is said alkanolamine.

12. The process of claim 1 wherein said release agent is applied periodically to said roll surface to maintain the release character of said roll surface to said elastomeric stock.

* * * * *